(12) United States Patent
Meister et al.

(10) Patent No.: US 7,363,155 B2
(45) Date of Patent: Apr. 22, 2008

(54) METHOD AND DEVICE FOR WARNING THE DRIVER OF A MOTOR VEHICLE

(75) Inventors: Dirk Meister, Moeglingen (DE);
Ulrike Ahlrichs, Korntal-Muenchingen (DE); Ulf Wilhelm, Rutesheim (DE);
Paco Haffmans, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/577,517

(22) PCT Filed: Jul. 22, 2004

(86) PCT No.: PCT/DE2004/001604

§ 371 (c)(1),
(2), (4) Date: May 17, 2007

(87) PCT Pub. No.: WO2005/054008

PCT Pub. Date: Jun. 16, 2005

(65) Prior Publication Data

US 2007/0282530 A1    Dec. 6, 2007

(30) Foreign Application Priority Data

Nov. 28, 2003   (DE) ................. 103 56 309

(51) Int. Cl.
*G06F 17/10* (2006.01)
(52) U.S. Cl. ...................... 701/301; 340/436
(58) Field of Classification Search ............ 701/1,
701/117, 118, 300, 301; 340/435, 436, 438
See application file for complete search history.

(56) References Cited

U.S. PATENT DOCUMENTS 5,467,072 A    11/1995   Michael
7,295,925 B2*  11/2007   Breed et al. ................ 701/301

FOREIGN PATENT DOCUMENTS

| EP | 1 387 183 | 2/2004 |
|---|---|---|
| WO | WO 02/08010 | 1/2002 |
| WO | WO 02/058955 | 8/2002 |
| WO | WO 03/006290 | 1/2003 |
| WO | WO 03/006291 | 1/2003 |

* cited by examiner

*Primary Examiner*—Richard M. Camby
(74) *Attorney, Agent, or Firm*—Kenyon & Kenyon LLP

(57) ABSTRACT

A method and a device for warning the driver of a motor vehicle about a traffic situation involving an increased collision risk are provided. For this purpose, signals of at least one object detector representing motion quantities of detected objects and signals of at least one motion sensor system of the host vehicle are suppliable to an analyzer device. The computing device precalculates all possible motion trajectories for all detected objects and for the host vehicle, taking into account maximum acceleration or deceleration values and maximum change in acceleration or deceleration values over time and, when an imminent collision is recognized, issues a warning to the driver that higher acceleration or deceleration values and/or change in acceleration or deceleration values are needed to avoid a collision.

9 Claims, 4 Drawing Sheets

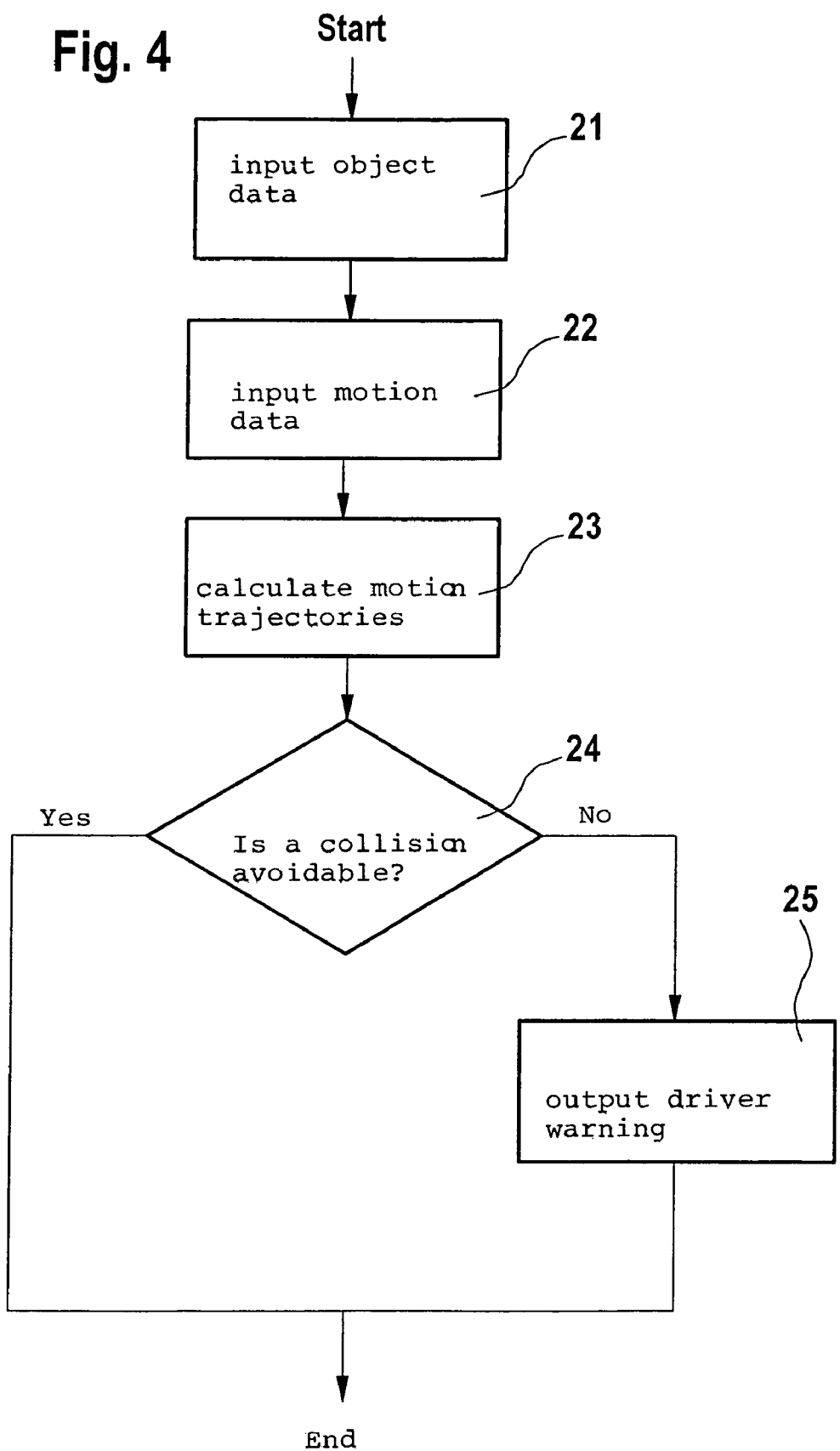

METHOD AND DEVICE FOR WARNING THE DRIVER OF A MOTOR VEHICLE

FIELD OF THE INVENTION

The present invention relates to a method and a device for warning the driver of a motor vehicle of a traffic situation involving an increased collision risk, for which purpose signals of at least one object detector representing motion quantities of detected objects and signals of at least one motion sensor system of the host vehicle are suppliable to an analyzer device.

BACKGROUND INFORMATION

Published International patent application WO 03/006291 describes a method and a device for triggering and executing vehicle deceleration to avoid a collision, in which objects in the sensor detection range are recognized by a distance and speed regulating device of the vehicle, and measured quantities are determined for each recognized object, the recognized objects are assigned to different object classes on the basis of the corresponding measured quantities determined, and the motion trajectories of the objects are predicted on the basis of the assignment of the recognized objects to a particular class.

Published International patent application WO 03/006290 describes a method and a device for controlling deceleration systems in a vehicle during a braking operation, in particular in a vehicle equipped with a sensor for adaptive cruise control. During the braking operation, measures of danger are determined on the basis of dynamic driving models, which are individualized by signals of the environment sensor system.

SUMMARY

The present invention provides a warning to the driver of a motor vehicle equipped with an object detection device of driving situations involving an increased collision risk by advising the driver, in a timely manner, that acceleration or deceleration values and/or change in acceleration or deceleration values representing a motion dynamics of the vehicle which are higher than the vehicle driving dynamics generally perceived as comfortable are necessary to avoid a collision. The driver is thereby advised that the he/she must implement highly dynamic vehicle accelerations or vehicle decelerations in the longitudinal and/or transverse direction to mitigate the effect of an imminent collision with another vehicle.

The maximum acceleration or deceleration values and the maximum change in acceleration or deceleration values over time are advantageously of such magnitudes that the driver perceives them as just still comfortable.

It is furthermore advantageous that different maximum values and maximum change values over time are provided for the longitudinal vehicle acceleration, the longitudinal vehicle deceleration, and the transverse vehicle acceleration.

The maximum acceleration or deceleration values and the maximum change in acceleration or deceleration values over time are advantageously variable as a function of the instantaneous vehicle velocity. For example, at higher vehicle velocities higher acceleration or deceleration values, and/or higher change in acceleration or deceleration values over time, may also be provided.

It is furthermore advantageous that the maximum acceleration or deceleration values and the maximum change in acceleration or deceleration values over time are variable as a function of the driving situation recognized by the object detector.

It is furthermore advantageous that, in addition to the warning to the driver, an automatic intervention in the vehicle drive systems, the vehicle deceleration systems, and/or the vehicle steering systems may be performed.

The at least one object detector may be a radar sensor, a laser sensor, an ultrasound sensor, or a video sensor, or a combination thereof.

The motion sensor system may be at least a velocity sensor, an acceleration sensor, and/or a yaw rate sensor.

The implementation of the method according to the present invention may be in the form of a control element which is provided for a control unit. A program is stored on the control unit, the program being executable on a computing device, e.g., on a microprocessor or signal processor and suitable for performing the method according to the present invention. In this case, the present invention is therefore implemented by a program stored on the control element, so that this control element provided with the program represents the present invention in the same way as the method which the program is suitable for executing. An electric memory medium, such as a read-only memory, may be used as the control element.

BRIEF DESCRIPTION OF THE DRAWINGS

FIG. 4 shows a flow chart of an embodiment of the method according to the present invention.

DETAILED DESCRIPTION

Figure 1:
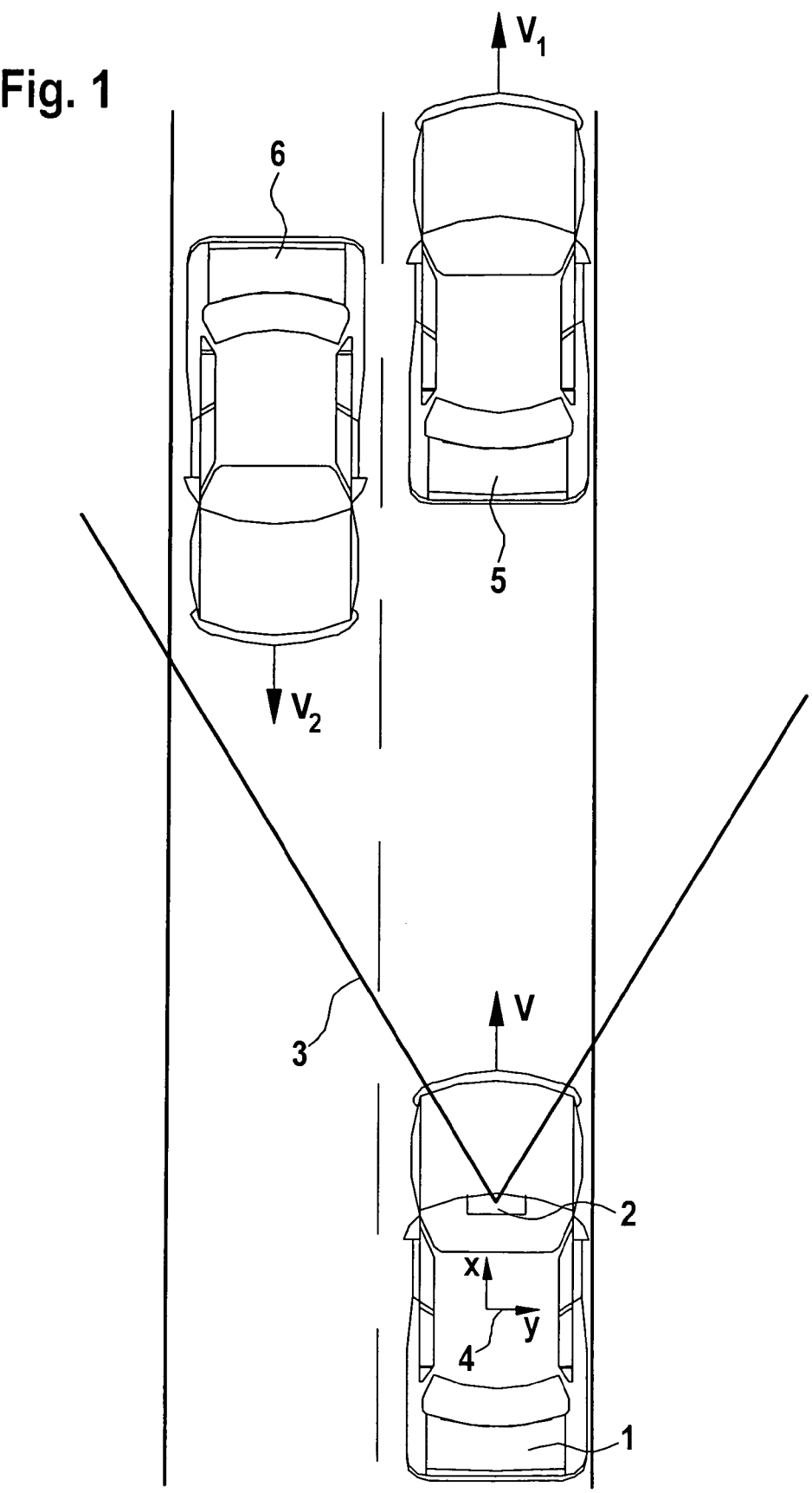
FIG. 1 shows an exemplary traffic situation where the device according to the present invention and the method according to the present invention are applicable.

FIG. 1 shows a two-lane road where one lane is provided for each driving direction. Of course, the method according to the present invention and the device according to the present invention may also be used in driving situations on multilane roads with or without lanes for traffic in the opposite direction. The figure shows host vehicle 1, which is equipped with an object detector 2. This object detector 2 may be a radar sensor, a laser sensor, a video sensor, an ultrasound sensor, or a combination thereof, for example, and may be installed in the front area of the vehicle or in the windshield area, for example. Object detector 2 is oriented in such a way that sensor detection range 3 detects the area in front of vehicle 1 and recognizes objects 5, 6 within this area. In front of host vehicle 1, which moves on the road with velocity V, a preceding vehicle 5 moves in the same direction with velocity V1 in the present example. There is an additional vehicle 6, which moves in the opposite direction with velocity V2. Object detector 2 now recognizes vehicles 5, 6 and may determine distance d of these vehicles to the host vehicle, their relative velocities Vrel with respect to host vehicle 1, and azimuth angle alpha, which, in combination with distance d, determines the position of vehicles 5, 6, relative to the longitudinal vehicle axis of host vehicle 1. Furthermore, the figure shows a coordinate system 4, which is advantageously a global coordinate system, i.e., a fixed coordinate system. A first X axis is provided in the direction of the longitudinal vehicle axis, and a second, Y axis which is oriented in the transverse direction of the vehicle.

Figure 2:
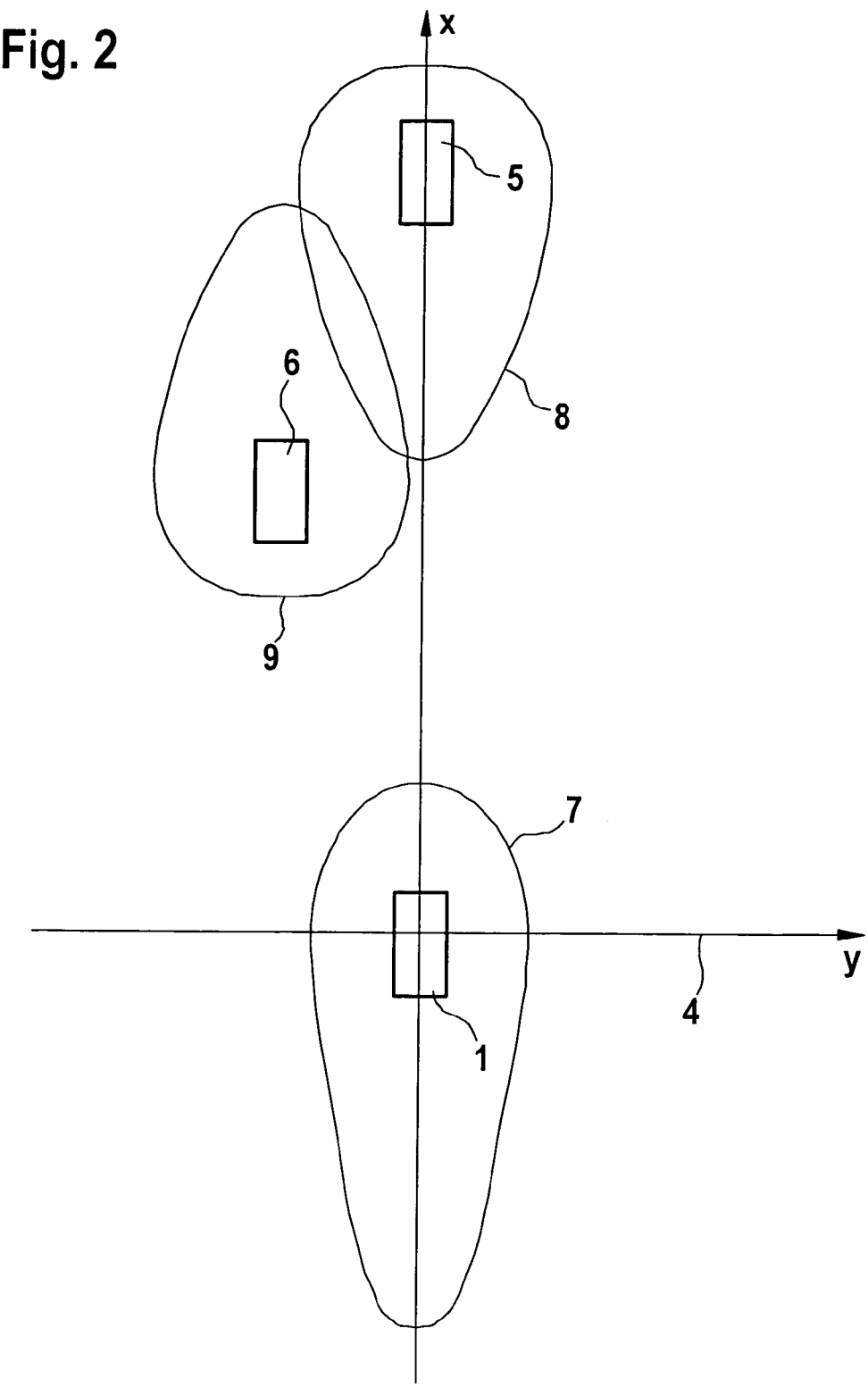
FIG. 2 shows a block diagram of the situation illustrated in FIG. 1 and the location areas derived from the possible motion trajectories.

FIG. 2 shows coordinate system 4, which corresponds to the global coordinate system of FIG. 1. FIG. 2 also shows the X axis, which is oriented in the longitudinal vehicle axis, and the Y axis, which is oriented in the transverse direction of the vehicle. Schematically illustrated host vehicle 1 is located at the origin of coordinate system 4; schematically illustrated preceding vehicle 5 is located in the range of positive X values on the X axis, as is vehicle 6 traveling in the opposite direction with an offset in the direction of negative Y values. A motion trajectory is calculated for a predefined future time period t for the maximum accelerations or maximum decelerations and the maximum changes in acceleration or deceleration over time which are just still perceived as comfortable by an average driver. Combinations of deceleration, acceleration or steering intervention by the driver may also be considered here, so that all maximally reachable points which are shown in the coordinate system moving with vehicle 1 are determined within computation period t. Relative velocities Vrel of additional vehicles 5, 6 and their absolute velocities V1, V2, which are computable if their relative velocities and velocity V of host vehicle 1 are known, are also taken into account. If these points are plotted in fixed coordinate system 4, areas 7, 8, 9 result around recognized vehicle location positions 1, 5, 6, respectively, which also have different distances in different directions. For example, within the zone 7, the driver thus perceives a vehicle deceleration as still comfortable even if its magnitude is greater than the maximum longitudinal acceleration value which the driver perceives as just still comfortable. An average driver is considerably more sensitive to transverse vehicle accelerations, so that the distances of maximum trajectory areas 7, 8, 9 in the perpendicular direction to the direction of the vehicle's travel are smaller than in the longitudinal direction of the vehicle, the maximum trajectory area in the direction opposite to that of the vehicle's travel being greater than the maximum trajectory area in the direction of the vehicle's travel, because the driver perceives as comfortable longitudinal deceleration values whose magnitude is greater than that of longitudinal acceleration values, and the driver perceives as comfortable longitudinal acceleration and deceleration values that are greater than accelerations in the transverse direction of the vehicle, such as those which occur for example due to steering maneuvers. This results in maximum motion trajectory areas 7, 8, 9 as indicated in FIG. 2. These maximum trajectory areas assume the shape of deformed ellipses, the major axes of the ellipses being oriented in the longitudinal direction of the vehicle, and the minor ellipsis axes in the transverse direction of the vehicle. The major axes of the ellipses have considerably greater areas in the direction of deceleration than can be indicated as an ellipse, because the driver perceives as comfortable decelerations whose magnitude is greater than, for example, accelerations which represent the shorter major ellipsis axes in the direction of travel, and the minor ellipsis axes are smaller in magnitude than the major ellipsis axes, because an average driver responds to transverse vehicle accelerations in a very sensitive manner, finding them uncomfortable even if their magnitudes are small.

Figure 3:
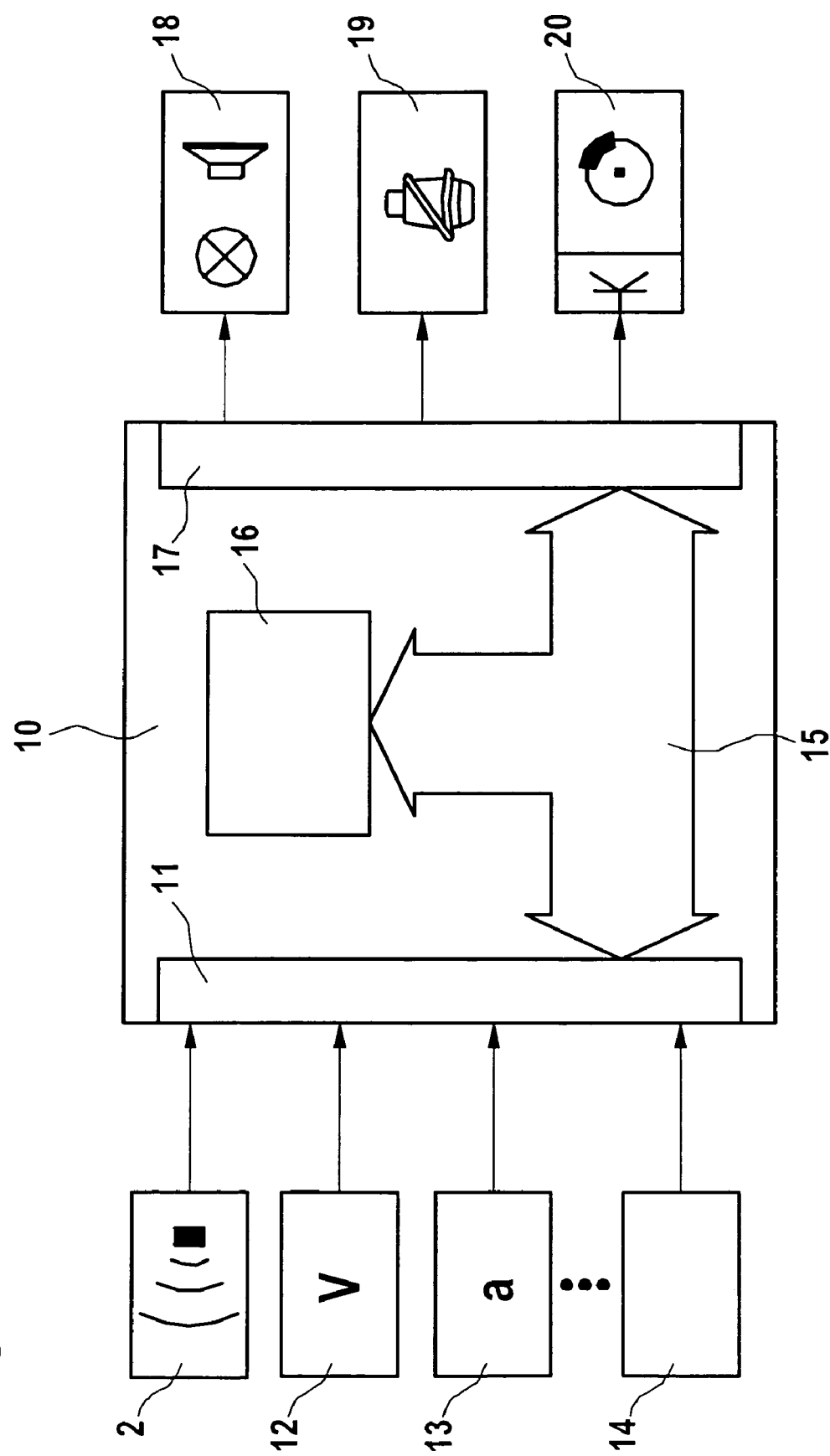
FIG. 3 shows a schematic block diagram of an embodiment of the device according to the present invention.

FIG. 3 shows an analyzer device 10 which has an input circuit 11 among other things. Input signals are supplied to analyzer device 10 via input circuit 11. Signals of an object detector 2, which may be designed, for example, as a radar sensor, a laser sensor, an ultrasound sensor, a video sensor, or a combination of these sensor types, are provided as input signals. This object detector 2 detects objects 5, 6, which move within detection area 3 and determines their distances d to host vehicle 1, relative velocities $V_{rel}$ of objects 5, 6 relative to host vehicle 1, and azimuth angles alpha relative to the axis of symmetry of detection area 3 (FIG. 1), at which objects 5, 6 are located at the time. It is also possible to determine additional quantities using object detector 2, for example, the type of object, for example, whether it is a moving vehicle or a stationary object on the roadside, or whether it is a passenger car, a truck, or a two-wheeled vehicle. These determined quantities are supplied by object detector 2 to input circuit 11 of analyzer device 10. A velocity sensor 12 is also provided, which determines velocity V of host vehicle 1 and supplies it to analyzer device 10. If velocity V of the host vehicle is known, it is possible to convert relative quantities Vrel determined by object detector 2 into absolute quantities V1, V2. A dedicated velocity sensor may be provided, for example, as velocity sensor 12, but a velocity sensor 12 provided for other vehicle functions such as an antilock system of vehicle 1 or an electronic stability program may also be used. Furthermore, analyzer device 10 receives a signal of an acceleration sensor 13 via input circuit 11; this sensor detects longitudinal accelerations and transverse accelerations of host vehicle 1 separately and supplies them to analyzer device 10. Acceleration sensor 13 may also be omitted as an alternative, and acceleration signal a may be calculated by differentiating velocity signal V of velocity sensor 12 over time. In addition to the above-described devices for providing input quantities, further devices 14 may also be provided, for example, an operating device, via which the driver of vehicle 1 may change the operating states of analyzer device 10 or whose settings the driver may match to his/her individual wishes.

The input signals supplied to input circuit 11 are relayed by a data exchange system 15 to a computing device 16, which may be designed as a microprocessor or signal processor, for example. Computing device 16 determines manipulated variables, as a function of the input signals supplied to it, for output to downstream actuators 18, 19, 20 in which the input quantities are processed according to the method according to the present invention and used for determining output quantities. The output quantities determined by computing device 16 are supplied via a data exchange system 15 to an output circuit 17, via which analyzer device 10 outputs manipulated variables to downstream actuators 18, 19, 20. An acoustic and/or visual warning device may be provided as an actuator, for example, which may be in the form of an indicator light or a plain text display installed, for example, in the area of the dashboard of the vehicle, and used to output a warning. Furthermore, the acoustic and/or visual warning device may output an acoustic warning signal, which may be a signal tone, or a text output which explicitly states the reason of the warning to the driver. It is furthermore possible as an alternative, or in combination, to provide reversible seat belt tensioners 19 as the warning device, which signal, by one-time or multiple pre-tensioning operations on the safety belt of the driver or of all occupants of the vehicle, that the comfort limits regarding the vehicle acceleration or vehicle deceleration and/or the comfort limits regarding the change in acceleration rate or change in deceleration rate over time have been exceeded, and higher accelerations or decelerations and/or higher change in acceleration or deceleration values over time are needed to prevent a collision situation. Furthermore, as an alternative or in combination, it is also possible to communicate an appropriate warning signal to the driver via a brief deceleration of the vehicle by deceleration systems 20, to which an output signal of analyzer device 10 may be supplied. Providing a brief deceleration via the deceleration systems has the advantage that the coefficient of friction of the road may be determined via this brief vehicle braking operation, and the coefficient of friction of the road is known for a subsequent intense deceleration of the vehicle to prevent a collision, making it possible to control the deceleration accordingly. In addition, the driver is informed intuitively via a brief braking operation of the vehicle that a hazardous situation exists.

FIG. 4 shows an example embodiment of the method according to the present invention which may be executed, for example, in the form of a control program in computing device 16. After the start of the method, at the point "Start," the object data, determined, for example, by object detector 2 and supplied to analyzer device 10, is input in method step 21. In the subsequent method step 22, the motion data of host vehicle 1, which includes, for example, velocity V and acceleration a of the host vehicle, is input. It is furthermore possible to draw a conclusion, on the basis of stationary or moving objects recognized in detection area 3, about a special driving situation of vehicle 1, for example, whether it is traveling on a single-lane or multilane road, whether the road has curves ahead, or whether it is recognized as a straight, highway-like road, and possibly the traffic density in the road stretch ahead. Motion trajectories for recognized vehicles 5, 6 and host vehicle 1 are calculated on the basis of the data supplied to analyzer device 10 in subsequent method step 23. When calculating the motion trajectories, the determined driving situation is taken into account, and the maximum reachability of the objects within time period t, observing the assumed comfort limits, is calculated via assumed maximum longitudinal and/or transverse accelerations of the vehicle and/or maximum changes in longitudinal and/or transverse acceleration values over time, where the accelerations may also be decelerations. In subsequent step 24 it is determined whether a collision is avoidable. In this case, the vehicle acceleration or deceleration and/or the change in acceleration or deceleration values over time must be increased, whereby motion trajectory areas 7, 8, 9 are enlarged via highly dynamic vehicle maneuvers, making it possible to avoid a collision. If it is determined in step 24 that a collision is avoidable, for example, due to the fact that there is a residual area in trajectory areas 7, 8, 9, which has no overlap, the sequence diagram branches off to "yes" and is continued with the step "end." If it is determined in step 24 that a collision is unavoidable if the comfort limits are observed, for example, due to the fact that there is no residual area without overlap taking into account the comfort limits, step 24 branches off to "no" and in subsequent method step 25 a warning is issued to the driver by one or more of warning devices 18, 19, 20. After issuing a warning to the driver in step 25, the sequence diagram is continued in step "end," and branches off to "start" again, from where the method steps are repeated.

What is claimed is:

1. A method for warning a driver of a motor vehicle of a traffic situation involving an increased collision risk, comprising:
supplying signals from at least one object detector to an analyzer device, wherein the signals represent motion quantities of at least one detected object;
supplying signals from at least one motion sensor system to the analyzer device, wherein the signals represent motion quantities of the motor vehicle;
calculating by the analyzer device all possible motion trajectories for each detected object and for the motor vehicle, taking into account: a) one of maximum acceleration value and maximum deceleration value; and b) one of maximum change in acceleration value over time and maximum change in deceleration value over time; and
issuing a warning to the driver, when an imminent collision is recognized based on the calculating by the analyzer device, wherein the warning includes an indication that at least one of the following is needed to avoid a collision: a) higher acceleration value; b) higher deceleration value; c) a higher change in acceleration value over time; and d) a higher change in deceleration value over time.

2. The method as, recited in claim 1, wherein the maximum acceleration value, the maximum deceleration value, the maximum change in acceleration value over time, and the maximum change in deceleration value over time have magnitudes that are comfortable for the driver.

3. The method as recited in claim 1, wherein for each of longitudinal vehicle acceleration, longitudinal vehicle deceleration, and transverse vehicle acceleration, different maximum values and different maximum change values over time are provided.

4. The method as recited in claim 3, wherein: a) one of the maximum acceleration value and the maximum deceleration value; and b) one of the maximum change in acceleration value over time and the maximum change in deceleration value over time, are variable dependent on an instantaneous velocity of the vehicle.

5. The method as recited in claim 3, wherein: a) one of the maximum acceleration value and the maximum deceleration value; and b) one of the maximum change in acceleration value over time and the maximum change in deceleration value over time, are variable dependent on a traffic situation represented by the signals from the at least one object detector.

6. The method as recited in claim 3, wherein, when an imminent collision is recognized, in addition to issuing the warning to the driver, an automatic intervention in at least one vehicle drive systems, vehicle deceleration systems and vehicle steering systems is triggered.

7. A system for warning a driver of a motor vehicle of a traffic situation involving an increased collision risk, comprising:
at least one object detector for supplying signals representing motion quantities of at least one detected object;
at least one motion sensor system for supplying signals representing motion quantities of the motor vehicle;
an analyzer device operatively coupled to the at least one object detector and the at least one motion sensor system for receiving signals from the at least one object detector and the at least one motion sensor system to calculate all possible motion trajectories for each detected object and for the motor vehicle, taking into account: a) one of maximum acceleration value and maximum deceleration value; and b) one of maximum change in acceleration value over time and maximum change in deceleration value over time; and
a driver warning device operatively coupled to the analyzer device for issuing a warning to the driver when an imminent collision is recognized based on the calculating by the analyzer device, wherein the warning includes an indication that at least one of the following is needed to avoid a collision: a) higher acceleration value; b) higher deceleration value; c) a higher change in acceleration value over time; and d) a higher change in deceleration value over time.

8. The system as recited in claim 7, wherein the at least one object detector is one of a radar sensor, a laser sensor, an ultrasound sensor, a video sensor, and a combination thereof.

9. The system as recited in claim 7, wherein the at least one motion sensor system is at least one of a velocity sensor, an acceleration sensor, and a yaw rate sensor.

* * * * *